(12) United States Patent
Thurmeier et al.

(10) Patent No.: US 9,882,177 B2
(45) Date of Patent: Jan. 30, 2018

(54) ENERGY STORAGE MODULE COMPRISING A PLURALITY OF PRISMATIC STORAGE CELLS AND METHOD FOR PRODUCTION THEREOF

(71) Applicant: Bayerische Motoren Werke Aktiengesellschaft, Munich (DE)

(72) Inventors: Markus Thurmeier, Adlkofen (DE); Hubertus Goesmann, Nattheim-Auernheim (DE); Robert Lustig, Munich (DE); Eva Vietze, Munich (DE); Stephan Zuegner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 29 days.

(21) Appl. No.: 14/052,202

(22) Filed: Oct. 11, 2013

(65) Prior Publication Data

US 2014/0038029 A1    Feb. 6, 2014

Related U.S. Application Data

(63) Continuation of application No. PCT/EP2012/001908, filed on May 4, 2012.

(30) Foreign Application Priority Data

May 27, 2011    (DE) .......................... 10 2011 076 583

(51) Int. Cl.
 *H01M 2/02* (2006.01)
 *H01M 2/10* (2006.01)
 (Continued)

(52) U.S. Cl.
 CPC ......... *H01M 2/024* (2013.01); *B60L 11/1864* (2013.01); *B60L 11/1879* (2013.01);
 (Continued)

(58) Field of Classification Search
 CPC . Y10T 29/49108; H01M 2/02; H01M 2/0217; H01M 2/024; H01M 2/1072;
 (Continued)

(56) References Cited

U.S. PATENT DOCUMENTS

| 4,100,333 A | 7/1978 | Haas et al. |
| 4,617,072 A | 10/1986 | Merz |

(Continued)

FOREIGN PATENT DOCUMENTS

| CN | 1585174 A | 2/2005 |
| CN | 1992385 A | 7/2007 |

(Continued)

OTHER PUBLICATIONS

Chinese Office Action dated Feb. 4, 2015 with partial English translation (Eleven (11) pages).

(Continued)

*Primary Examiner* — Jonathan Jelsma
*Assistant Examiner* — Omar Kekia
(74) *Attorney, Agent, or Firm* — Crowell & Moring LLP

(57) ABSTRACT

The invention relates to an energy storage module for a device for supplying voltage, in particular, of a motor vehicle, comprising a plurality of in particular prismatic storage cells, which are stacked together at least in one row, are arranged one behind the other and are braced between at least two end plates by means of at least one tie rod or a wrapping, wherein at least one of the end plates comprises a layer structure of at least three layers and/or the tie rod consists of a fiber composite material.

20 Claims, 4 Drawing Sheets

(51) Int. Cl.
*H01M 10/04* (2006.01)
*B60L 11/18* (2006.01)

(52) U.S. Cl.
CPC ..... *H01M 2/1072* (2013.01); *H01M 10/0481* (2013.01); *H01M 2/02* (2013.01); *H01M 2/0217* (2013.01); *H01M 2/0267* (2013.01); *H01M 2/0295* (2013.01); *H01M 2220/20* (2013.01); *Y02T 10/7005* (2013.01); *Y02T 10/7061* (2013.01); *Y10T 29/49108* (2015.01)

(58) Field of Classification Search
CPC ............ H01M 2/0267; H01M 2/0295; H01M 2220/20; H01M 10/0481; Y02T 10/7061; Y02T 10/7005; B60L 11/1864; B60L 11/1879
USPC ............... 429/149, 156, 452, 467, 471, 535; 29/623.1
See application file for complete search history.

(56) References Cited

U.S. PATENT DOCUMENTS

| | | | |
|---|---|---|---|
| 5,496,659 A * | 3/1996 | Zito | 429/105 |
| 5,756,227 A | 5/1998 | Suzuki et al. | |
| 5,817,434 A | 10/1998 | Brooker et al. | |
| 5,993,987 A * | 11/1999 | Wozniczka | H01M 8/247 429/470 |
| 6,372,372 B1 * | 4/2002 | D'Aleo | H01M 8/247 429/434 |
| 6,821,671 B2 | 11/2004 | Hinton et al. | |
| 7,572,549 B2 | 8/2009 | Wegner | |
| 8,054,041 B2 | 11/2011 | Kim et al. | |
| 8,426,079 B2 | 4/2013 | Okada | |
| 8,481,229 B2 | 7/2013 | Kozu et al. | |
| 2005/0042493 A1 | 2/2005 | Fujita et al. | |
| 2005/0058891 A1 | 3/2005 | Marraffa | |
| 2005/0064268 A1 * | 3/2005 | Cho et al. | 429/37 |
| 2007/0007141 A1 | 1/2007 | Maeda et al. | |
| 2008/0280194 A1 | 11/2008 | Okada | |
| 2009/0017367 A1 * | 1/2009 | Marubayashi | H01M 6/42 429/99 |
| 2009/0214900 A1 | 8/2009 | Hoffjann et al. | |
| 2009/0286134 A1 * | 11/2009 | Kim et al. | 429/34 |
| 2010/0136405 A1 | 6/2010 | Johnson et al. | |
| 2010/0190049 A1 | 7/2010 | Kawase et al. | |
| 2011/0212380 A1 * | 9/2011 | Andreas-Schott | H01M 8/0271 429/469 |
| 2012/0282506 A1 | 11/2012 | Hohenthanner et al. | |
| 2012/0288741 A1 | 11/2012 | Gutsch et al. | |
| 2012/0301775 A1 | 11/2012 | Lachenmeier et al. | |

FOREIGN PATENT DOCUMENTS

| | | |
|---|---|---|
| CN | 201130692 Y | 10/2008 |
| CN | 201134452 Y | 10/2008 |
| CN | 101314424 A | 12/2008 |
| CN | 101582507 A | 11/2009 |
| CN | 101682073 A | 3/2010 |
| DE | 43 34 282 A1 | 4/1995 |
| DE | 196 33 095 A1 | 2/1997 |
| DE | 101 23 579 A1 | 11/2002 |
| DE | 10 2005 031 504 A1 | 1/2007 |
| DE | 10 2006 029 511 A1 | 1/2007 |
| DE | 10 2005 051 583 A1 | 5/2007 |
| DE | 10 2006 048 291 A1 | 2/2008 |
| DE | 10 2008 059 964 A1 | 6/2010 |
| DE | 10 2008 059 966 A1 | 6/2010 |
| DE | 10 2009 057 565 A1 | 7/2010 |
| DE | 10 2009 035 482 A1 | 2/2011 |
| DE | 10 2009 028 920 A1 | 3/2011 |
| DE | 10 2009 040 147 A1 | 3/2011 |
| DE | 10 2009 048 250 A1 | 4/2011 |
| EP | 0 151 213 A1 | 8/1985 |
| EP | 0 264 073 B1 | 4/1988 |
| GB | 1 526 279 A | 9/1978 |
| GB | 2 283 089 A | 4/1995 |
| JP | 2002-042763 A | 2/2002 |
| JP | 2004-235110 A | 8/2004 |
| JP | 2007-294407 A | 11/2007 |
| JP | 2008-124033 A | 5/2008 |
| JP | 2009-048965 A | 3/2009 |
| WO | WO 2006/024421 A2 | 3/2006 |
| WO | WO 2007/117212 A2 | 10/2007 |
| WO | WO 2011/054544 A1 | 5/2011 |

OTHER PUBLICATIONS

International Search Report dated Feb. 18, 2013, with Statement of Relevancy (Nine (9) pages).
German Search Report dated Feb. 10, 2012, with Statement of Relevancy (Five (5) pages).
International Search Report dated Jul. 23, 2012, with Statement of Relevancy (Five (5) pages).
German Search Report dated Jan. 17, 2012, with Statement of Relevancy (Five (5) pages).
International Search Report dated Jul. 8, 2012, with Statement of Relevancy (Five (5) pages).
European Search Report dated Mar. 19, 2015, with Statement of Relevancy (Twelve (12) pages).
Chinese Office Action issued in counterpart Chinese Application No. 201280009146.1 dated Sep. 7, 2015, with partial English translation (Seventeen (17) pages).
Chinese Office Action issued in Chinese counterpart application No. 201280009146.1 dated Jan. 5, 2017, with partial English translation (Nine (9) pages).
Chinese Office Action issued in Chinese counterpart application No. 201280009146.1 dated Jul. 5, 2017, with partial English translation (Seven (7) pages).

* cited by examiner

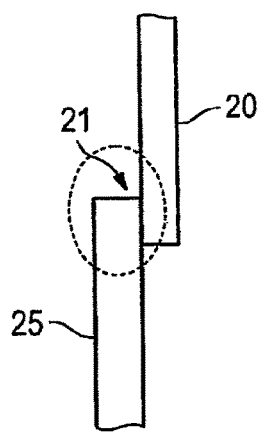
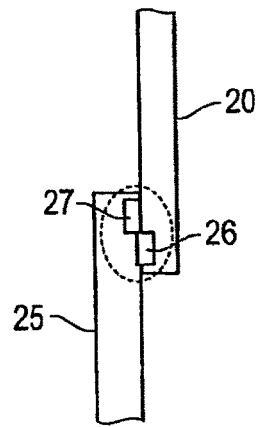
Fig. 5    Fig. 6
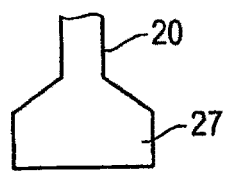
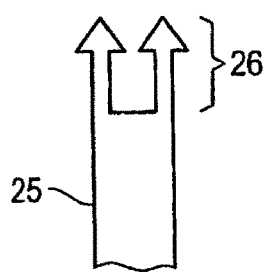
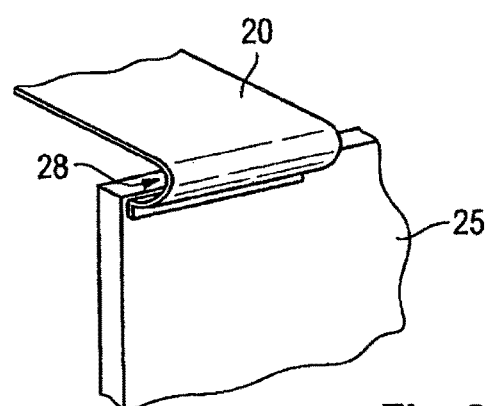
Fig. 7    Fig. 8

ENERGY STORAGE MODULE COMPRISING A PLURALITY OF PRISMATIC STORAGE CELLS AND METHOD FOR PRODUCTION THEREOF

CROSS REFERENCE TO RELATED APPLICATIONS

This application is a continuation of PCT International Application No. PCT/EP2012/001908, filed May 4, 2012, which claims priority under 35 U.S.C. §119 from German Patent Application No. DE 10 2011 076 583.2, filed May 27, 2011, the entire disclosures of which are expressly incorporated by reference herein.

BACKGROUND AND SUMMARY OF THE INVENTION

The invention relates to an energy storage module for a device for supplying voltage, particularly of a motor vehicle, comprising a plurality of prismatic storage cells which, stacked in at least one row, are arranged behind one another and braced between at least two end plates by means of at least one tie rod or a wrapping. The invention further relates to a method of producing an energy storage module.

In a device for supplying voltage to a motor vehicle usually called a battery, a plurality of energy storage modules is mostly used for the drive of the vehicle, for example, of electric vehicles or hybrid vehicles. A respective energy storage module typically consists of several stacked prismatic storage cells. The individual storage cells contain electrochemical cells of the battery. The stack of individual storage cells is usually braced by means of a mechanical end plate and tie rods to form the energy storage module. In addition to mechanically fixing the modules with respect to one another, the end plates and tie rods especially have the purpose of counteracting a deformation by the change or increase of the internal gas pressure during the operation of the electrochemical cells of the storage module arranged in the interior of the modules.

The end plates and tie rods of the conventional energy storage modules are usually produced by means of the extrusion process from steel or aluminum. The production of such so-called extruded sections is connected in this case with high production-related expenditure and the resulting high costs. Extruded sections for energy storage modules can therefore not be cost-effectively produced on a large scale. Conventional extruded sections for energy storage modules further have the disadvantage that they are heavy because of the material properties of the used material, which has a disadvantageous effect on the total weight of the motor vehicle. Furthermore, the materials forming the extruded section, such as steel or aluminum, are electrically conductive, so that an insulating layer is required between the individual storage cells and the tensioning device, in order to prevent electric couplings between the storage cells. The providing of such insulating layers is costly and increases the manufacturing expenditures of the energy storage module and thereby the costs for its production.

It is an object of the present invention to provide a cost-effective energy storage module for a device for supplying voltage, which can be produced in a simple manner and, in addition to a very high stability, has a low net weight. It is a further object of the present invention to provide a method of producing an energy storage module that requires low production-related expenditures and, in addition, permits a simple and cost-effective manufacturing of the energy storage module.

The object is achieved by means of the combinations of characteristics of the independent claims. The dependent claims indicate advantageous embodiments of the invention.

The object is therefore achieved by an energy storage module for a device for supplying voltage, particularly of a motor vehicle, comprising a plurality of prismatic storage cells which, stacked in at least one row, are arranged behind one another and braced between at least two end plates (also called pressure plates) by means of at least one tie rod or a wrapping. At least one of the end plates has a layer structure of at least three layers, and/or the tie rod consists of a composite-fiber material. Usually, one end plate respectively is mounted on the respective face side of the stacked cells disposed at the end, so that the energy storage module comprises two end plates. However, one end plate may also consist of several individual plates, in which case then, according to the invention, at least one of these individual plates has a layer structure of at least three layers and/or the tie rod consists of a fiber composite material.

If the end plate of the energy storage module according to the invention has a layer structure, this layer structure comprises at least three layers, whereby a sufficient stability of the end plate is ensured with respect to a compression deformation. Additional layers may be provided. The layers may be formed of different materials which comprise metals or alloys, such as steel and also synthetic materials, in which case the respective layers may all or partly be made of the same material or in each case of different materials. Suitable materials can be combined with one another, possibly with the aid of fastening elements or adhesive components. In comparison to conventional extruded sections, such a layer structure has the advantage that the stability of the end plates can be adjusted in a targeted manner corresponding to the demands, and furthermore, an effective weight reduction of the net weight of the end plate and therefore of the energy storage module is achieved. The production expenditures of such an end plate are also low, which lowers not only the technical and business-economics-related demands on the production of the energy storage module according to the invention but also its production costs, and thereby the costs of the energy storage module. In the case of a provided layer structure of the energy storage module according to the invention, the bracing may also take place by way of conventional tension elements, which are particularly designed in the form of tie rods.

The end plates of the energy storage module according to the invention may be braced by way of at least one tension element, particularly a tie rod or a wrapping. The number and shape of the tension elements depends on their individual design. Depending on the required stability, one tie rod or, for example, several tie rods may be provided which connect (brace) the end plates to one another which are mounted on the face side on the exterior storage cells. In this case, such a tie rod may be made of metal, for example, of steel or aluminum, and has a shape that permits a permanent connection and bracing of the storage cell module comprising storage cells and end plates.

According to the invention, the tension element is constructed as a tie rod; however, advantageously, the tie rod may also be formed of a fiber composite material. This is particularly so when conventional materials comprising extruded sections are used as an end plate. Fiber composite materials are known from the prior art. As a rule, they comprise a matrix material and corresponding fibers, the fibers being present in the matrix material in a predominantly homogenously distributed fashion, which contributes significantly to the stability of the fiber composite material. Because the net weight of the fiber composite material is lower than that of conventional metallic materials, the use of a tie rod made of fiber composite material reduces the weight of the energy storage module and thereby increases the suitability of the energy storage module according to the invention for motor vehicles produced, for example, as lightweight constructions.

If no tie rod is provided for the bracing of the storage cells and the end plates, such a bracing can take place by a wrapping. A wrapping in the sense of the invention is a type of wrapping of the storage cell module with suitable materials which cause a stable connection between the storage cell stack and the end plates, so that the energy storage module will meet the necessary stability demands; i.e. it counteracts the deformation caused by pressure changes in the interior of the storage cell during the operation. Such wrappings may, for example, be implemented by means of metal strips, fiber materials or wires.

Conventional further components, such as electric connections and insulators between the cells and/or the storage cells and the bracing element, can complete the energy storage module according to the invention.

In an advantageous embodiment, it is provided that both end plates of the energy storage module have a layer structure of at least three layers. The weight reduction of the energy storage module according to the invention is thereby increased multiple times. The production expenditures and therefore the costs of the energy storage module according to the invention are thereby also reduced.

In a further preferred implementation, it is provided that the layer structure of the end plate is a sandwich-type structure, which comprises a first and a second outer layer and at least one inner layer, the first and second outer layer surrounding the inner layer and at least one outer layer or at least one inner layer consisting of a fiber composite material. As indicated above, fiber composite materials are known from the prior art. By using fiber composite materials in at least one layer of the at least three-layer end plate of the energy storage module according to the invention, while the stability of the end plate remains good or is even improved, the weight of the end plate and therefore that of the energy storage module according to the invention can be reduced because of the lower net weight of the fiber composite material. This is particularly advantageous if the energy storage module is provided for a vehicle of a lightweight construction.

Preferably, for example, the inner layer is formed of an injection-molding material containing fibers, and particularly of a thermoplastic material, the fibers preferably being short fibers which are homogeneously distributed in the injection-molding material. A homogeneous distribution of fibers in the sense of the invention is also a diffuse distribution, in which the fibers are arranged in all directions, thus anisotropically, however, the fiber density being essentially the same in all regions of the respective layer. In this case, the respective outer layers can be formed of conventional metals, such as aluminum. The layers are mutually connected in a conventional manner, as required, with the aid of fastening devices. The use of an inner layer made of the above-mentioned fiber composite material, while the stability is sufficient, significantly reduces the net weight of the end plate and thereby contributes to the weight reduction of the energy storage module according to the invention.

Furthermore, it is preferably provided that all layers, thus both outer layers and the inner layer as well as, if required, additional inner layers of the end plate of the energy storage module consist of a fiber composite material. This further reduces the weight of the energy storage module and, in addition, simplifies the production of the end plate because layers of fiber composite materials can be connected with one another particularly easily and well and without any high technical expenditures, whereby the stability of the end plate of the energy storage module according to the invention is clearly increased. This predominantly applies to identical fiber composite materials as well as to different fiber composite materials.

The end plate according to the invention preferably has a three-layer structure, in which the respective outer layers are formed by a fiber composite material, which has unidirectional long fibers in a preferably thermoplastic matrix material, the inner layer surrounded by the outer layers being formed by short fibers embedded in a preferably thermoplastic injection molding material. The presence of short fibers is not absolutely necessary but increases the stability of the inner layer by the diffuse arrangement of the short fibers. Furthermore, preferably all three layers have the same matrix material and, in particular, the same thermoplastic matrix material. This simplifies the production of the layer structure, thus the laminating of the layers, and results in a particularly good stability of the three-layer structure. In the case of different matrix materials, the different layers can be mutually connected, if necessary, with the aid of conventional fastening devices or adhesive materials. If the inner layer is formed of an injection molding material, this layer may also have an inherent structure and therefore does not have to have a planar design but can advantageously also have a type of wavy structure, which provides the end plate with additional stability with respect to deformation forces acting upon it.

In a further advantageous development, it is provided that the end plates as well as the tie rod consist of a fiber composite material. The fiber composite material of the end plates and of the tie rod may be the same material or different materials, preferably the same fiber composite material. As a result, the weight of the energy storage module is further efficiently reduced and its production is simplified because, as a result of the use of fiber composite materials for the tie rod as well as for the end plates, these can be easily mutually connected in a durable and efficient manner without any high technical expenditures. Furthermore, because of the use of the fiber composite material, as a rule, an electric insulation of the storage cells and of the seams of the storage cells and of the tie rod will not be necessary. This applies particularly when the fiber material also consists of an electrically non-conductive material.

According to another advantageous embodiment, the wrapping comprises an additional element, which at least partially surrounds the stacked storage cells as well as the end plates, and a fiber composite material, in which case the fiber composite material at least partially surrounds the additional element. As mentioned above, a wrapping is provided as an alternative to the use of a tension element or tie rod. In this embodiment, an additional element is placed around the cell module comprising stacked storage cells and end plate, which additional element surrounds the cell module at least partially. This additional element forms a stable base for the fiber composite material to be added later, so that the fiber composite material will not get between the stacked cells, and furthermore, a sufficiently stable bracing of the energy storage module according to the invention will be ensured. Suitable additional elements comprise, for example, possibly structured metal plates or metal sheets, which may also be constructed in several layers, duromeric or thermoplastic synthetic sections, such as duromeric honeycomb cores or thermoplastic deep-drawn sections. These additional elements may surround the cell module completely or only partially. This depends on the required stability and size of the energy storage module, thus, also on the pressure created in the interior of the storage cells during the operation of the energy storage module, and can take place in the suitable size and shape corresponding to the used material. In this case, a partial surrounding of the cell module by the additional element reduces the costs of the energy storage module. It is further provided that the additional element is at least partially surrounded by a fiber composite material. The latter may be wrapped or wound around the additional element and thereby also around the cell module in the form of a mat or a band and is provided with a matrix material which penetrates and/or surrounds the fiber structure, and thus contributes to the sufficient stability of the wrapping. The fiber material preferably is a roving or a fiber band made of several individual fibers which, before being wrapped around the additional element, is dipped into a bath containing the matrix material. If the matrix material is a thermosetting plastic, the energy storage module according to the invention is hardened after the completion of the wrapping whereby the thermosetting plastic obtains its final shape and stability, in which case, the hardening of the thermosetting plastic takes place by means of conventional methods, for example, by means of light curing or thermosetting. When a thermoplastic material is used, the latter is heated to its melting point or softening point, whereby it softens sufficiently and adheres to the fiber band (or roven) pulled through the bath. The hardening takes place by cooling the wrapped energy storage module.

As an alternative, the wrapping may also takes place such that an already pre-wrapped fiber structure provided with matrix material is stretched, for example, under the effect of heat and is put over the energy storage module or a provided additional element.

Advantageously, the fiber composite material for the end plate and/or the tie rod and/or the wrapping has a thermoplastic matrix with fibers or a duromeric matrix with fibers. Such fiber composite materials are easily available in the desired hardness or elasticity and are distinguished by low cost and, in addition, by insulating properties, whereby, as a rule, insulating layers between the individual storage cells as well as the storage cells and the tie rod will not be necessary, which clearly causes a simplification of the production and therefore also reduces the manufacturing costs. In addition, these materials have a low net weight in comparison to current extruded sections and are easily workable by means of conventional devices without any high technical expenditures, which keeps the production costs of the energy storage module according to the invention low. Particularly preferably, the fiber composite material is distinguished by a thermoplastic matrix with fibers, because, as a result of their melting capacity, thermoplastic materials can be worked particularly easily and nevertheless provide a sufficient stability. A thermoplastic that is particularly preferred because of the low cost and the good availability is polypropylene (PP).

According to a further advantageous embodiment, it is provided that the fibers of the composite material for the end plate and/or of the tie rod and/or of the wrapping are selected from glass fibers, carbon fibers, mineral fibers, such as basalt fibers, plant fibers, as, for example, cellulose fibers or hemp fibers, ceramic fibers, such as mullite fibers or SiC fibers, steel fibers or synthetic fibers, as, for example, polypropylene fibers, nylon fibers or aramid fibers or mixtures thereof. The fibers can be selected depending on the demand profile. Glass fibers are particularly preferred because they are characterized by high stability, good availability and electrically insulating properties. In addition, glass fibers can be obtained at reasonable cost in the necessary stability grades. This lowers the production costs of the energy storage module according to the invention while its stability is very good. The fibers may be present as long fibers or short fibers, long fibers clearly increasing the stability of the fiber composite material. Furthermore, the fibers may be unbound, thus be present as a disperse distribution in the matrix material. However, the fibers are at least joined to form fiber bundles or even fiber mats, weaves, knits, wovens, nonwovens and the like, because the stability of the fiber composite material is thereby increased multiple times.

The energy storage module according to the invention is further advantageously characterized in that the fibers are unidirectional fibers. This means that the fibers are present in the fiber composite material in a manner aligned in a preferred direction. This increases the stability of the fiber composite material precisely in this direction. For this reason, the fiber composite material, which has unidirectional fibers, is advantageously arranged in the loading direction, because the tensile strength of the fibers can thereby most efficiently counteract possible deformations as a result of the pressure change in the interior of the storage cells during their operation.

In a further advantageous embodiment, the end plates and/or tie rods of the energy storage module according to the invention have fastening elements and/or floor fastening elements. Fastening elements are used for connecting the end plates with the tie rod. Floor fastening elements are used for fastening an energy storage module, for example, with the surrounding housing of the energy storage module. Such fastening elements or floor fastening elements may, for example, be eyes, feet, ribs, lugs, notches, rivets or grooves. By means of, for example, corresponding lugs or eyes on an end plate as well as on a tie rod or tie rods between one another, for example, by means of the insertion of a pin or of a screw through both lugs, or eyes, a durable stable connection between the tie rod and the end plate can be provided in a simple manner. Such fastening elements are preferably an integral part of the component to be fastened (for example, the tie rod or the end plate), which is particularly made possible by the use of synthetic materials or fiber composite materials as the tie rod and/or the end plate. Integrated injection-molded-on fastening elements increase the connection with the surrounding components and thereby ensure sufficient stability of the energy storage module in its environment even under the influence of mechanical forces, as they are transmitted during the intended use of the energy storage module. The fastening element or floor fastening elements may be designed in any form, for example, as eyes, ribs, clips, lugs or bolts, and in any number. At least floor fastening elements are preferably provided at least on each floor-side corner of the energy storage module according to the invention. Fastening elements or floor fastening elements can easily be integrated in the corresponding component by means of current injection molding processes, whereby the production costs of the energy storage module and the technical expenditures for its production and thereby also its costs are considerably reduced. This is not least the result of the fact that possible finishing steps, such as the separate providing of fastening elements, are eliminated. Furthermore, the production of the energy storage module according to the invention can be more easily and more comprehensively automated, which prevents the occurrence of faults during the implementation and further also contributes to the lowering of production costs and to an increase in production.

According to a further advantageous embodiment, the end plates are mutually connected with the tie rod or several, thus more than two, tie rods by screwing and/or upsetting and/or welding and/or by means of at least one clip, and/or by means of a reshaping, in which case a tie rod reaches behind and/or reaches around, for example, an end plate. Suitable screwing devices are known from the state of the art. Wing screws have been very successful. In this case, the wing screw is guided through an eye provided, advantageously integrated, for example, in the end plate or in a first tie rod, as well as through an eye provided, advantageously integrated, in another tie rod, and screwed onto the end side by means of a wing nut, which clearly reduces the production-related expenditures, because a mounting of fastening elements is at least partially eliminated. Such a screwed connection ensures a permanent connection of the components. The tie rods may also have an upsetting deformation around at least a portion of the end plate or of a first tie rod, usually around at least a lateral edge, and be connected with it in this manner. In this case, upsetting deformations have the advantage of not requiring additional fastening elements. The upsetting deformation of a tie rod can comfortably take place after the arrangement of the cells, and be carried out individually, thus as a function of the size of the cell stack. In addition, tie rods can be welded to one another or also to end plates. Conceivable welding processes comprise ultrasonic welding, laser welding and friction welding. The suitable welding process is selected in coordination with the used materials. A welded connection ensures a permanent connection of the end plate with the tie rod or of the tie rods to be connected with one another. In a further development, the tie rods can be connected with one another or the tie rods can also be connected with the end plates by means of a clip. In this case, clip elements have the advantage that they can be mounted afterwards at any locations, thus after the arrangement of the cell stack, and therefore individually. Clip connections are independent of the size and shape of the cell stack, which reduces the production-related expenditures and permits a certain variability of the production process. If the tie rod as well as the end plate to be connected therewith comprises a thermoplastic material, the two components or also several tie rods among one another can be mutually connected also by heating the respective areas to be connected until the thermoplastic material has become soft and by a subsequent pressing against one another or pressing. The heating can, for example, be carried out, by means of mirror welding using a heatable aluminum plate. Such a plastic connection can be established in a simple manner and without any high technical expenditures and, after the hardening of the material, thus the cooling of the connected materials, provides a sufficiently stable connection of the components. Because of the reduced manufacturing expenditures, also as a result of the absence of separate or integrated fastening devices, the production costs and the technical and logistical expenditures of the production of the energy storage module according to the invention are reduced even more. This method is therefore particularly suitable for the production of cost-effective energy storage modules for motor vehicles of a lightweight construction. The respective fastening mechanisms may also be combined with one another, so that, for example, in addition to a welded connection, a screwed and/or bracing connection (clip connection) can be provided, which clearly increases the stability of the anchoring of the tie rods among one another or of the tie rods with the end plate.

Furthermore, a method is provided according to the invention for producing an energy storage module described above. The method comprises the providing of an end plate consisting of at least three layers and/or of a tie rod made of a fiber composite material, if required, the providing of fastening elements and/or floor fastening elements on at least one end plate and/or a tie rod, the mounting of at least one end plate respectively on the respective front face of the storage cells disposed at the end of the prismatic storage cells stacked in a row and the bracing of the end plates, preferably by way of at least one tie rod or a wrapping.

If the bracing of the end plates is carried out by means of a wrapping, advantageously the following process steps are carried out: Mounting of an additional element which at least partially surrounds the cell module of stacked storage cells and end plates; rotating of the cell module equipped with the additional element around a fiber band running through a resin bath and, if required, hardening of the energy storage module. A hardening step is provided particularly when duromeric materials are used and can take place by means of current processes, such as light hardening or thermosetting. If floor fastening elements, for example, are provided at the end plates, they will be left free during the wrapping, so that they can still carry out their function.

As an alternative to the above, the wrapping can also take place such that already shaped, thus wrapped fibers provided with a matrix material are stretched, for example, by heating and stretching the wrapping when thermoplastic matrix materials are used, and subsequently the wrapping is put over the cell module, where it then solidifies in its shape by cooling.

The advantageous embodiments described within the scope of the energy storage module according to the invention are correspondingly advantageously applied within the scope of the method according to the invention for producing the energy storage module.

A method of producing an energy storage module is thereby provided which is easy to implement and variable in its application. The method according to the invention requires only low production-related expenditures and thereby contributes to the lowering of the production costs of the energy storage module and thereby of its overall costs. By the providing of integrated fastening elements and/or integrated floor fastening elements, finishing steps are for the most part eliminated, which again reduces the costs for the production of the energy storage module according to the invention. In addition to a high quality, a mechanical, chemical and physical stability and an efficient operating mode, the energy storage module according to the invention has a lower net weight than energy storage modules comprising extruded sections, whereby the total weight of a motor vehicle containing the energy storage module according to the invention is reduced, so that it is particularly suitable for motor vehicle of a lightweight construction. Because of the reduced production costs, the costs of the energy storage module are also low.

In the following, the invention will be explained in detail by means of the drawing.

BRIEF DESCRIPTION OF THE DRAWINGS

FIG. 5 is a view of two tie rods connected by way of a welded connection;

FIG. 6 is a view of two tie rods connected by means of a metal insert and an injection-molded-on locking device;

FIG. 7 is an enlarged view of the anchoring mechanism of FIG. 6;

FIG. 8 is a view of two tie rods connected by means of an upsetting;

DETAILED DESCRIPTION OF THE DRAWINGS

Figure 1:
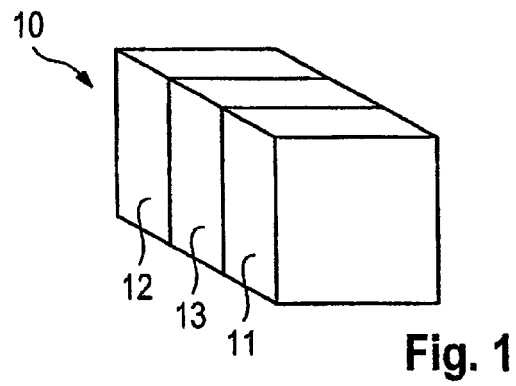
FIG. 1 is a view of an end plate of the energy storage module according to an embodiment, which has a layer structure consisting of at least three layers.

FIG. 1 illustrates an end plate 10 in a sandwich construction which has a first outer layer 11 and a second outer layer 12 and an inner layer 13 disposed in-between.

A three-layer structure, as an example, comprises a first outer metal layer 11 and a second outer metal layer 12, which surround a further inner metal layer 13, the metal layers 11, 12, 13 preferably being metal plates or metal sheets, and the inner layer 13 having a certain structure for absorbing the deformation as a result of the increase of internal gas pressure during the operation of the electrochemical cells arranged in the interior of the energy storage module.

Such a structure may be formed by a simple reshaping, for example, by forming a wavy structure. In this case, the metal layers 11, 12, 13 may be stamped out in any size from a metal base material, such as steel plate or aluminum sheet. As an alternative or in addition, at least the inner metal layer 13 may also be a metal plate to which the at least one stamping is applied. The structure of the metal plate generated by the reshaping or stamping is suitable for absorbing and diverting the pressure forces occurring in the interior of the energy storage module during its service life as a result of the cell operation, in order to counteract possible deformations in this manner. Irreversible damage to the energy storage module is thereby prevented, and sufficient stability of the energy storage module during its entire service life can be guaranteed. In contrast to the extruded sections, the three-layer structures described here have a lower net weight and thereby reduce the overall weight of the energy storage module and therefore also that of the motor vehicle in which the energy storage module according to the invention is installed. Furthermore, the production-related expenditures for producing such a three-layer structure are less than those of an extruded profile, which results in a clear cost reduction of the production of the end plate of the energy storage module according to the invention.

A further three-layer structure, as an example, comprises a first outer metal layer 11 and a second outer metal layer 12 which surround a further inner layer 13, the inner layer 13 being a duromer-containing layer or a thermoplastic-containing layer. Duromeric layers preferably comprise honeycomb-shaped or wavy layer structures, the thermoplastic layer preferably having a deep-drawn profile. In this case also, the inner layer 13 is again designed for absorbing and diverting the pressure change from the interior of the storage cells during their operation, in order to counteract a local deformation of the energy storage module. The respective layers can be mutually connected in a known manner, for example, mechanically by means of bracing elements or screwed connections, or chemically by means of an adhesive, or physically, for example, by means of laminating, in order to fix the three-layer structure in its initial form. As an alternative to this layer structure, the two outer layers 11, 12 may also consist of a plastic layer, in which case the inner layer 13 surrounded by the first outer layers 11 and the second outer layer 12 represents a metal layer, for example, a structured, thus shaped and/or stamped metal layer. Such a structure also has the required stabilities in order to counteract possible deformations.

A further three-layer structure, as an example, comprises a first outer plastic layer 11 and a second outer plastic layer 12, which surround a further inner plastic layer 13, in which case the plastic layers 11, 12, 13 may be duromeric and/or thermoplastic layers, and in which case at least the inner layer 13, as described above, has a certain structure for absorbing the pressure change from the interior of the storage cells. The connection of these layers may take place, for example, by gluing or laminating them. In the case of the use of exclusively thermoplastic materials, such a connection can, for example, simply take place by applying heat to intended locations of the layers to be connected to a softening point of the thermoplastic material and a subsequent pressing-against-one-another or pressing while the material is cooled. The heating is preferably carried out by means of mirror welding, in which case a heatable aluminum plate is inserted between two thermoplastic layers to be connected, from which aluminum plate the heat spreads to the surrounding thermoplastic layers which then soften and, after the removal of the aluminum plate, can be connected in a conventional manner, for example, by being pressed together or against one another. Mirror welding creates a particularly intimate, stable and uniform connection between the thermoplastic layers.

By the use of thermoplastic or duroplastic materials at least on the layer facing the storage cells, a further advantage can be achieved: Because of the insulating properties of the plastic materials, an electrically insulating material for preventing undesired couplings at this point can be at least partially eliminated, resulting in further savings with respect to the production as well as to costs.

A particularly preferred three-layer structure of an end plate of the energy storage module according to the invention is one where a first outer layer 11 and a second outer layer 12 surround an inner layer 13, at least one of the layers and further preferably all three layers consisting of a fiber composite material, and particularly a fiber composite material comprising a thermoplastic matrix and glass fibers. Such a structure is characterized by an excellent stability with respect to pressure, is cost-effective and very easy to work. In addition, such a material has insulating properties, so that the mounting of insulating layers in the energy storage module can at least partially be eliminated.

The energy storage module according to the invention, comprising an at least three-layer structure, as described above, is therefore distinguished by a net weight that is clearly reduced with respect to conventional extruded sections and, in addition, can be produced without high technical expenditures. This keeps the production expenditures and therefore the costs of the energy storage module according to the invention low.

Figure 2:
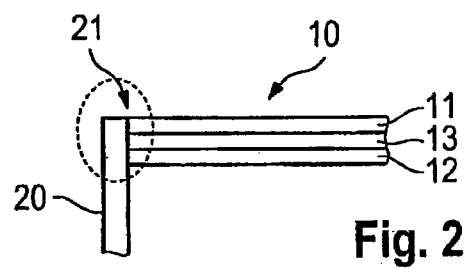
FIG. 2 is a view of a tie rod which is connected with a three-layer end plate by means of a welded connection.

FIG. 2 illustrates a tie rod 20 which is connected with a three-layer end plate 10 by means of a welded connection 21. This connection method is particularly suitable when at least one layer 11, 12, 13 of the end plate 10 as well as also the tie rod consist of a weldable material, thus particularly of aluminum, which thereby ensures the creation of a permanently stable connection.

Figure 3:
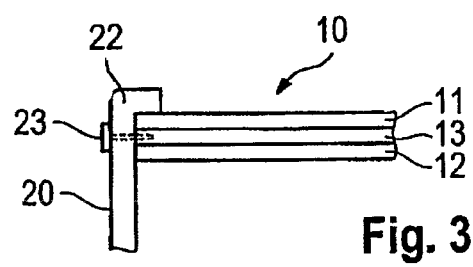
FIG. 3 is a view of a tie rod upset around a three-layer end plate at the corner, which tie rod is additionally screwed to the end plate.

FIG. 3 illustrates a tie rod 20 upset at the corner 22 around a three-layer end plate 10, which tie rod 20 was additionally connected by means of a screwed connection 23 with the end plate 10.

Figure 4:
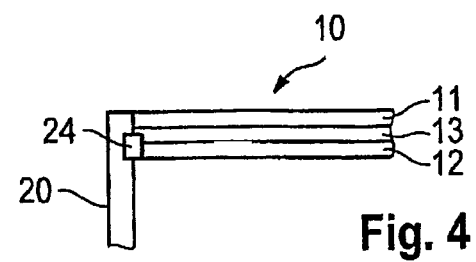
FIG. 4 is a view of a three-layer end plate which is connected by means of a clip with a tie rod made of fiber composite material with an injection-molded-on lug.

FIG. 4 illustrates a three-layer end plate 10 which is connected by means of a clip 24 with a tie rod 20 made of fiber composite material with an injection-molded-on lug (not shown).

FIG. 5 illustrates two tie rods 20, 25 connected by way of a welded connection 21. This connection mechanism is particularly suitable for tie rods 20, 25 made of metallic materials, such as steel or aluminum.

FIG. 6 illustrates two tie rods 20, 25 connected by means of a metal insert 26 and an injection-molded-on locking device 27, the anchoring mechanism from FIG. 6 being illustrated in an enlarged view in FIG. 7.

FIG. 8 illustrates two tie rods 20, 25 connected by means of an upsetting 28.

Figure 9:
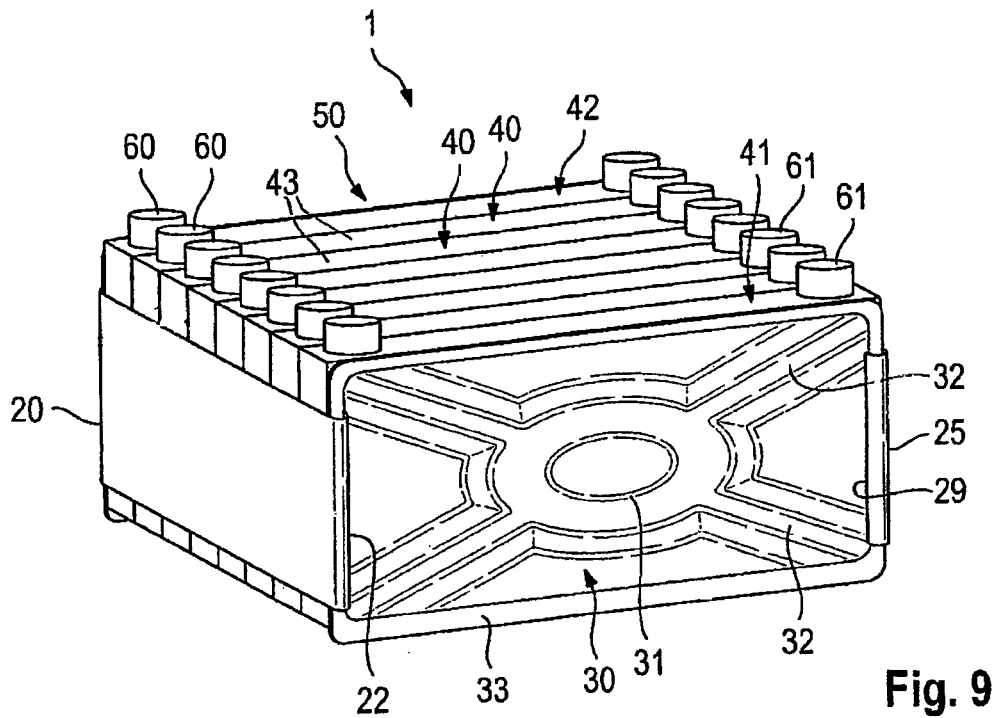
FIG. 9 is a view of an energy storage module according to an embodiment, comprising a plurality of prismatic storage cells arranged in a row and two end plates (=cell module), the cell module being braced by way of two tie rods.

FIG. 9 illustrates an energy storage module 1, which is equipped with storage cells 40 and, on the respective front sides (not shown) of the storage cells 41, 42 disposed at the end, has one end plate 30 respectively (only that end plate 30 of the front side of the two of storage cells 50 is shown), which is constructed as a stamped bent plate 30. In its surface center, the stamped bent plate 30 has an oval stamping 31 from which an oblong stamping 32 extends into each corner of the stamped bent plate 30. These stampings 31, 32 bulge toward the exterior side of the energy storage module 1.

The storage cell 40 typically consists of one or more individual electrochemical cells which, in the representation illustrated here, are situated in a hidden manner in the interior of the storage cell 40. On a front face 43, the storage cells 40 have a connection terminal of a first polarity 60 and a connection terminal of a second polarity 61. On the back side of the storage cells 40 not illustrated in this figure, no connection terminals are provided. One of the connection terminals 60, 61, typically the positive pole of the storage cell 40 can be electrically connected with a housing (not shown) of the storage cell 40.

Since, in the energy storage module 1 according to the invention, a plurality of storage cells 40 are arranged behind one another, stacked at least in one row, particularly when an electrically conductive material is used for the tie rod 20, at least opposite main surfaces (not shown) are equipped with an electrically insulating material. This may be an adhesive film which is applied to the main surfaces. As an alternative, an electrically insulating adhesive may be applied to the main surfaces. Likewise, the use of a heat-shrinkable sleeve, which is applied to the main surfaces provided with adhesive, would be conceivable.

In the embodiment, the bracing of the storage cells 40 stacked in a row 50 takes place by using end plates 30 and tie rods 20, 25, the tie rods 20, 25 consisting of a composite fiber material, so that no insulation material will be necessary. In this case, the tie rods 20, 25 are arranged parallel on opposite sides along the cell stack and are connected with the end plates 30 by means of a reshaping 29. As a result, the tie rod 20, 25 reaches around the edge 33 of the end plate 30, thus a lateral edge of the end plate. As a result of the further development of the end plates 30 in the form of a stamped punched bent plate 30, as well as by means of tie rods 20, 25 connected with the end plates 30 by a reshaping 29, a uniform expansion of the energy storage module 1 parallel to the direction of the force of the bracing (i.e. in the direction of the extending of the tie rods 20, 25) is ensured when the storage cells 40 in the storage cell row 50 deform as a result of gas pressure changes occurring during the operation of the storage cells 40. For reasons of completeness, it should be noted that the number of storage cells and their arrangement in one or more rows is arbitrary.

The reshaping 29 as a connection between the tie rods 20, 25 and the end plate 30 represents a simple, reliable and established connection method in the field of automotive engineering. However, in principle, the establishment of a mechanical connection may also take place in an alternative manner, for example, by welding, screwing or any other form-fitting and/or frictional connection.

Figure 10:
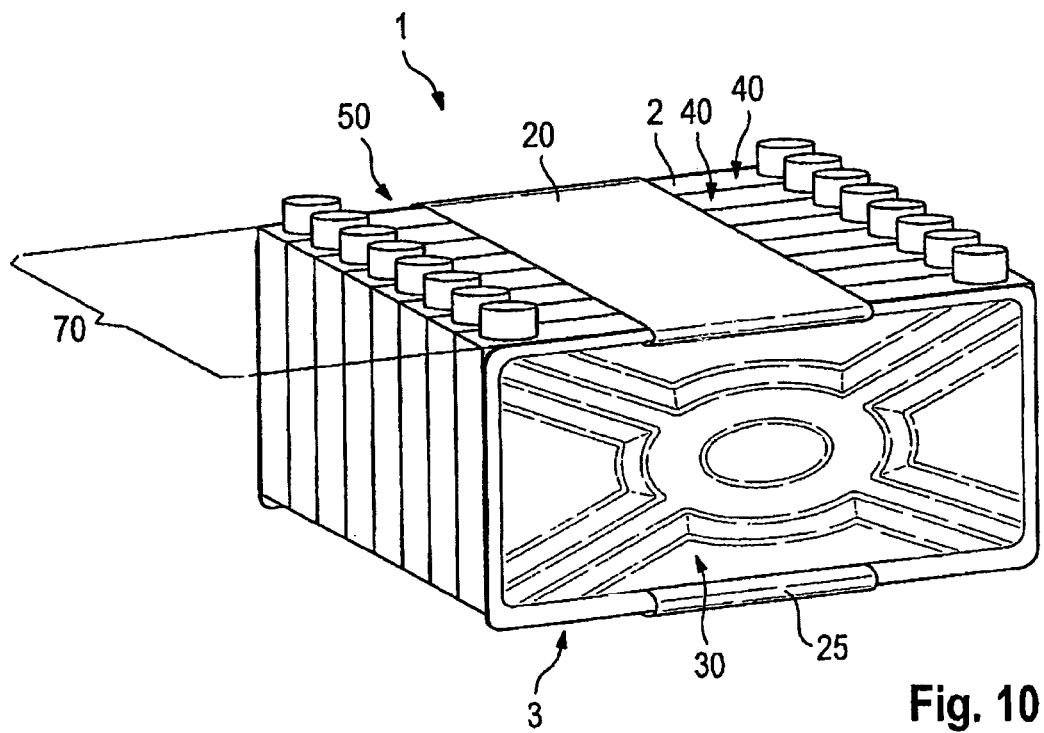
FIG. 10 is a view of an energy storage module according to a further embodiment, comprising a plurality of prismatic storage cells arranged in a row and two end plates (=cell module), the cell module being braced by way of a tie rod and by way of a heat dissipation plate constructed as a tie rod.

FIG. 10 illustrates an energy storage module 1 according to another embodiment, comprising a plurality of prismatic storage cells 20 arranged in a row 50 and two end plates 30, which together form a cell module 70, the cell module 70 being braced by way of a tie rod 20 and by way of a heat dissipation plate constructed as a tie rod 25. The construction of a tie rod 25 as a heat dissipation plate makes the additional mounting of a heat dissipation plate preferably on the underside 2 of the energy storage module 1, superfluous, which results in clear cost savings and in a simplification of the production process as well as in a connected lowering of the production costs of the energy storage module 1 according to the invention. The tie rod 20 is preferably constructed on the side of the end plate 30 opposite the heat dissipation plate constructed as a tie rod 25, thus on its top side. This clearly increases the stability of the energy storage module.

Figure 11:
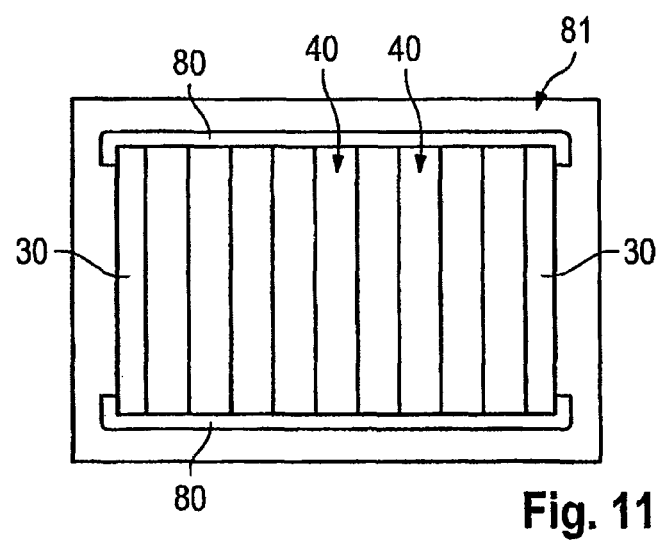
FIG. 11 is a view of an energy storage module according to a further embodiment, comprising a plurality of storage cells arranged in a row and two three-layer end plates, the bracing taking place by means of a wrapping.

FIG. 11 illustrates a storage cell arrangement consisting of storage cells 40 which are arranged in a row and which are surrounded by two end plates 30 having a three-layer structure (not shown). On its top and bottom side, this storage cell arrangement is surrounded by one additional element 80 respectively, which stabilizes the storage cells 40 with the end plates 30 with respect to their shape, before the storage cell arrangement is surrounded by wrappings 81 consisting of fibers saturated with matrix material and is hardened. This wrapping represents an alternative bracing mechanism for the use of tie rods, which also provides sufficient stability of the energy storage module, so that the energy storage module according to the invention can effectively counteract possible deformations as a result of a pressure increase in the storage cells 40.

Figure 12:
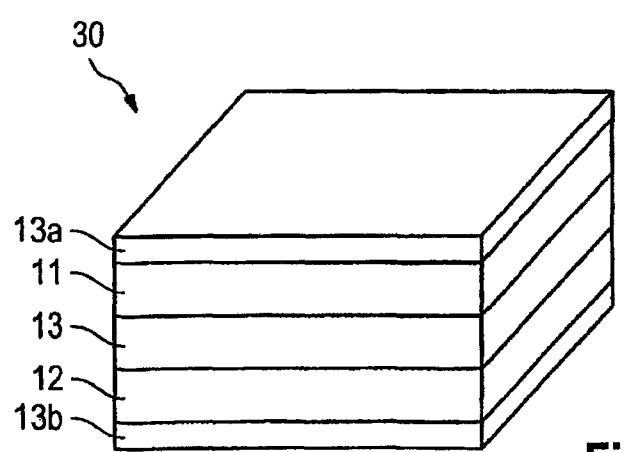
FIG. 12 is a view of a five-layer end plate according to a further embodiment of the invention.

FIG. 12 illustrates a five-layer end plate 30 according to a further embodiment of the invention. Here, the inner layer 13 is formed by a thermoplastic injection molding material containing short fibers, which preferably has a wavy structure (not shown) for increasing the stability of the end plate 30. The outer layers 11, 12 are metal plates, preferably made of aluminum. The additional third outer layer 13a and the fourth outer layer 13b situated on the outside are formed of the same thermoplastic material that also forms the inner layer. Such a five-layer structure is, for example, obtained as follows: Two metal plates having perforations (not shown) are placed in a mutually spaced manner into an injection mold. An inner layer 13 of a preferably thermoplastic material, preferably an injection molding material containing particularly short fibers, is placed between these metal plates. The mold will then be heated, whereby the thermoplastic matrix material of the inner layer 13 will soften. In addition, further, particularly thermoplastic material, preferably the same material that was also used for the production of the inner layer 13, is filled into the mold. This material surrounds and partially penetrates the inner layer 13 and thereby also binds the outer layers 11 and 12 onto the inner layer 13. Furthermore, the material also penetrates through the perforations onto the respective surface of the outer layers 11, 12 and flows around and envelopes them from the exterior side while forming the third and fourth outer layer 13a and 13b. A five-layer structure is thereby created. This five-layer structure has a compact composite of the layers 11, 12, 13, 13a and 13b, so that additional fastening elements between the layers will not be necessary. In comparison with conventional extruded sections, this five-layer structure is not only distinguished by a reduced weight but also by increased stability with respect to deformation as well as additional insulation which is provided by the third and fourth outer layer 13a and 13b.

LIST OF REFERENCE NUMBERS

1 Energy storage module
2 Top side of energy storage module
3 Bottom side of energy storage module
10 Three-layer structure
11 First outer layer
12 Second outer layer
13 Inner layer
13a Third outer layer
13b Fourth outer layer
20 Tie rod
21 Welded connection
22 Corner
23 Screwed connection
24 Clip
25 Tie rod
26 Metal insert
27 Injection-molded-on locking device
28 Upsetting
29 Reshaping
30 End plate
31 Oval stamping
32 Oblong stamping
33 Edge of end plate
40 Storage cells
41 Storage cell at the end
42 Storage cell at the end
43 Front side
50 Storage cell row
60 Connection terminal of first priority
61 Connection terminal of second priority
70 Cell module
80 Additional element
81 Wrapping The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage module for a device for supplying voltage to a motor vehicle, the energy storage module comprising:
    a plurality of prismatic storage cells, stacked in at least one row, and arranged behind one another;
    at least two end plates configured to brace the prismatic storage cells therebetween, wherein at least one of the at least two end plates comprises at least three layers, wherein the at least three layers are each formed entirely of a fiber composite material exclusive of interspersing material; and
    a coupler, including at least one of a tie rod and a wrapping completely surrounding the energy storage module, the coupler configured to couple the at least two end plates so as to brace the storage cells therebetween, the coupler consisting of a fiber composite material.

2. The energy storage module according to claim 1, wherein the at least two end plates have the layer structure of at least three layers.

3. The energy storage module according to claim 1, wherein the layer structure comprises:
    a first outer layer,
    a second outer layer, and
    at least one inner layer sandwiched between and coincident with the first and second outer layers,
    wherein at least one outer layer or at least one inner layer consists of a fiber composite material.

4. The energy storage module according to claim 1, wherein the coupler comprises at least one tie rod, and wherein the end plates and the at least one tie rod consist of a fiber composite material.

5. The energy storage module according to claim 1, wherein the wrapping comprises:
    an additional bracing element at least partially surrounding the stacked storage cells as well as the end plates, and
    a fiber composite material at least partially surrounding the additional bracing element.

6. The energy storage module according to claim 1, wherein the fiber composite material comprises one of: a thermoplastic matrix with fibers or a durometric matrix with fibers.

7. The energy storage module according to claim 4, wherein the fiber composite material comprises one of: a thermoplastic matrix with fibers or a durometric matrix with fibers.

8. The energy storage module according to claim 6, wherein the fibers are selected from the group consisting of: glass fibers, carbon fibers, mineral fiber, plant fibers, ceramic fiber, steel fibers, and synthetic fibers.

9. The energy storage module according to claim 8, wherein the fibers are unidirectional fibers.

10. The energy storage module according to claim 1, wherein at least one of the end plates and the tie rod have at least one of a fastening element and a floor fastening element.

11. The energy storage module according to claim 3, wherein at least one of the end plates and the tie rod have at least one of a fastening element and a floor fastening element.

12. The energy storage module according to one claim 1, wherein the end plates are connected with the tie rod in one of a screwed manner, an upset manner, a welded manner, by means of at least one clip and by means of a reshaping.

13. A fiber composite material for producing at least one of an end plate and a tie rod of the energy storage module according to claim 1.

14. The energy storage module according to claim 1, wherein the at least three layers comprises an inner layer sandwiched between and coincident with a first outer layer and a second outer layer, and wherein the inner layer is formed by an injection-molding material containing fibers.

15. The energy storage module according to claim 14, wherein the injection-molding material comprising the inner layer comprises a homogeneous distribution of fibers.

16. A method of producing an energy storage module for a device for supplying voltage to a motor vehicle, the energy storage module comprising: a plurality of prismatic storage cells stacked in at least one row and arranged behind one another, wherein the method comprises:
providing at least one end plate having at least three layers, wherein the at least three layers consist of a fiber composite material,
providing a tie rod made of a fiber composite material,
providing one of: fastening elements or floor fastening elements, on at least one of the at least one end plate and tie rod,
mounting the at least one end plate, respectively, on an exposed face side of the prismatic storage cells disposed at the end of the stacked row of prismatic storage cells, and
bracing the end plates via one of: a wrapping and at least one tie rod, wherein the wrapping is configured to completely surround the energy storage module.

17. The method according to claim 16, wherein the bracing takes place by means of the wrapping surrounding the energy storage module.

18. The method according to claim 17, wherein the bracing by way of the wrapping further comprises:
mounting an additional bracing element which at least partially surrounds the cell module of stacked storage cells and end plates,
rotating the cell module equipped with the additional bracing element around a fiber band running through a resin bath, and
hardening the energy storage module.

19. The method according to claim 16, wherein the at least three layers comprises an inner layer sandwiched between and coincident with a first outer layer and a second outer layer, and wherein the inner layer is formed by an injection-molding material containing fibers.

20. The method according to claim 19, wherein the injection-molding material comprising the inner layer comprises a homogeneous distribution of fibers.

* * * * *